(12) United States Patent
Korus

(10) Patent No.: US 7,710,915 B2
(45) Date of Patent: May 4, 2010

(54) METHOD AND A SYSTEM FOR MANAGING INFORMATION IN A WIRELESS NETWORK

(75) Inventor: Michael F. Korus, Eden Prairie, MN (US)

(73) Assignee: Motorola, Inc., Schaumburg, IL (US)

( * ) Notice: Subject to any disclaimer, the term of this patent is extended or adjusted under 35 U.S.C. 154(b) by 738 days.

(21) Appl. No.: 11/413,585

(22) Filed: Apr. 28, 2006

(65) Prior Publication Data

US 2007/0253353 A1    Nov. 1, 2007

(51) Int. Cl.
*G06F 15/16* (2006.01)
(52) U.S. Cl. ....................................... 370/328; 370/331
(58) Field of Classification Search .................. 370/311, 370/328, 331, 338, 468; 455/422.1
See application file for complete search history.

(56) References Cited

U.S. PATENT DOCUMENTS

2005/0050219 A1 * 3/2005 Choi et al. .................. 709/231

OTHER PUBLICATIONS

PCT Search Report Dated Sep. 19, 2008.

* cited by examiner

*Primary Examiner*—Sam Bhattacharya
(74) *Attorney, Agent, or Firm*—Valerie M. Davis; Anthony P. Curtis

(57) ABSTRACT

A system and method are provided for managing information in a wireless network. The information can be utilized during handoff of a client from an access point to an access point. The method includes a first frame being generated and transmitted by the client to the access point through the access point. The frame includes a request for the information, wherein the information includes at least a target beacon transmission time (TBTT) of the access point. The method also includes the client receiving a second frame containing the information from the access point through the access point.

17 Claims, 8 Drawing Sheets

METHOD AND A SYSTEM FOR MANAGING INFORMATION IN A WIRELESS NETWORK

FIELD OF THE INVENTION

This invention relates in general to wireless networks. More specifically, the invention relates to a method and system for managing information in wireless networks.

BACKGROUND OF THE INVENTION

In wireless networks, a handoff usually occurs when a user of a client moves from a current cell to another cell. Examples of the client include a laptop, a personal digital assistant (PDA), a mobile phone, and the like. Each cell is serviced by at least one access point. Handoff refers to the process of transferring an ongoing call or data session from a channel connected to the current cell to a channel connected to another cell. It is desirable to have low interference and a smooth transfer during the handoff. In order to achieve this, the time span of the handoff should be minimized.

The handoff process involves scanning access points that are adjacent to a first access point, while the client is associated with the first access point. This scanning involves analyzing the beacon frames broadcast by each access point adjacent to the first access point. These beacon frames are broadcast regularly by all the access points. The time at which an access point broadcasts the beacon frame is referred to as the target beacon transmission time (TBTT). Further, each beacon frame is broadcast after regular intervals called beacon intervals. Consider a case of a handoff of the client to a second access point. The scanning process can be hastened if the client is aware of the next target beacon transmission time of the second access point. The current TBTT and the beacon interval can be used to predict the next TBTT.

The scanning is followed by the authentication of the client by the second access point. The authentication server authenticates the client. This authentication is usually performed by using an Authentication, Authorizing and Accounting (AAA) protocol such as, for instance, Remote Authentication Dial-In Service (also known as the RADIUS protocol) as currently defined in Internet Engineering Task Force (IETF) Request for Comments (RFCs) 2865 and 2866. This is followed by a 4-way handshake between the client and the second access point.

Two known methods exist for collecting the TBTT and the beacon interval of access points of interest. The first method is mentioned above, which is by scanning the beacon frame of each access point adjacent to the first access point separately. However, a particular shortcoming of this method is that often, some of the access points adjacent to the first access point are hidden. One reason for an access point being hidden is the presence of an intercepting infrastructure such as a building. In such a scenario, the client is not able to receive the beacon frames of the hidden access points and is, therefore, unable to scan such beacon frames to determine the TBTT and beacon interval for the hidden access point.

The other method for learning the TBTT and the beacon interval is by using Institute of Electrical and Electronics Engineers (IEEE) standard 802.11k neighbor maps. Neighbor maps comprise a list of access points adjacent to the first access point, and their target beacon transmission times and beacon intervals. However, a shortcoming of this method is that it does not account for the effects of clock drifting. Clock drifting causes the TBTTs and the beacon intervals to change, thereby, making it difficult to determine whether the TBTTs and the beacon intervals recited in the neighbor maps are current.

In light of the above discussion, there is a need for a method for learning the TBTT and the beacon interval more efficiently.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF THE INVENTION

Figure 1:
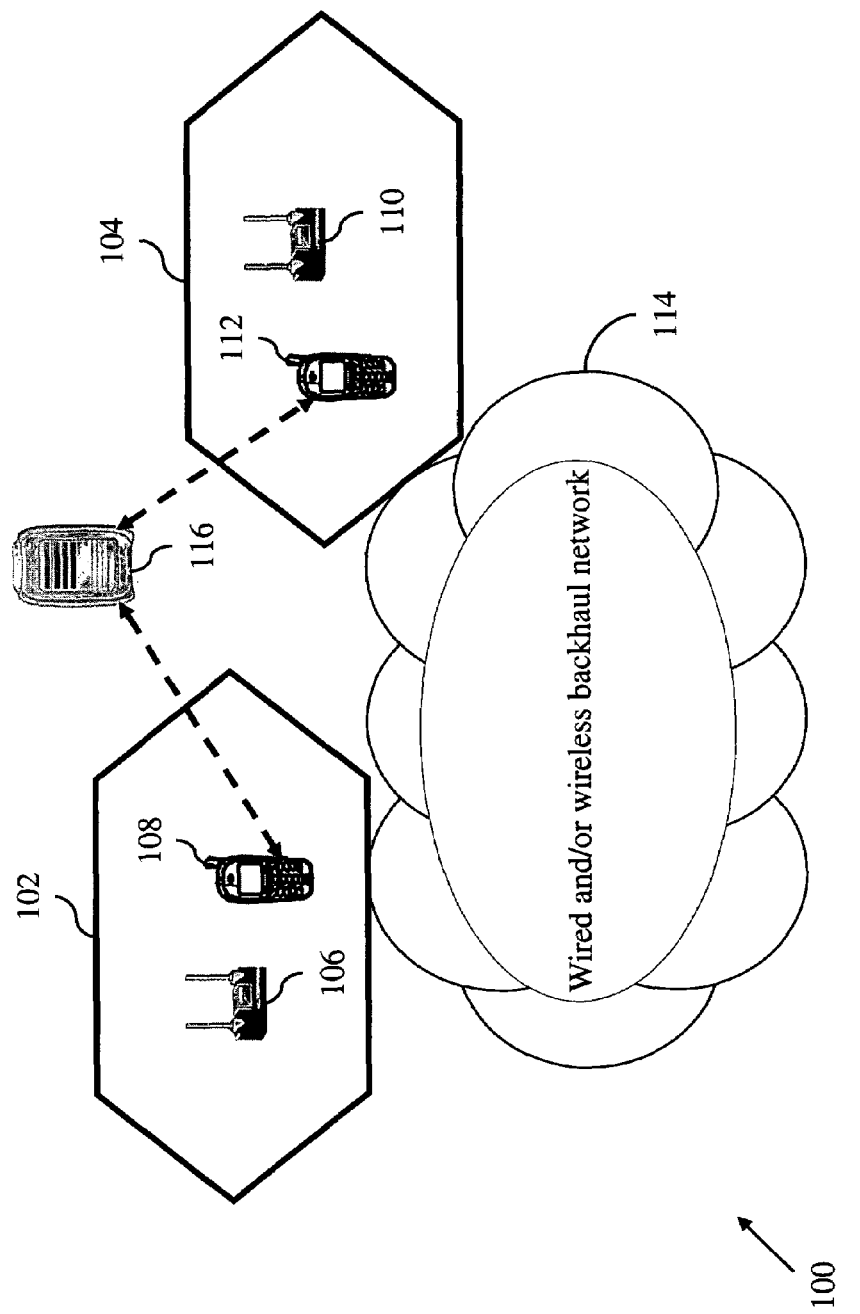
FIG. 1 is a block diagram illustrating an environment where various embodiments of the present invention can be implemented.

Before describing in detail embodiments that are in accordance with the present invention, it should be observed that the embodiments reside primarily in combinations of method steps and apparatus components related to a method and apparatus for managing information in a wireless network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

It will be appreciated that embodiments of the invention described herein may be comprised of one or more conventional processors (or "processing devices") and unique stored program instructions that control the one or more processors to implement, in conjunction with certain non-processor circuits, some, most, or all of the functions of the method and apparatus for managing information in a wireless network described herein. The non-processor circuits may include, but are not limited to, a radio receiver, a radio transmitter and user input devices. As such, these functions may be interpreted as steps of a method to perform the managing of information in a wireless network described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In an embodiment, a method in a client for collecting information in a wireless network is provided. The information is utilized in a handoff of the client from a first access point to a second access point. The client generates and transmits a first frame to the second access point via the first access point. The first frame includes a request for the information. This information comprises at least a target beacon transmission time (TBTT) of the second access point. The client receives a second frame from the second access point via the first access point. The second frame includes the information.

In another embodiment, a method in a second access point for distributing the information in the wireless network is provided. The information is utilized in the handoff of the client from the first access point to the second access point. The second access point receives a first frame, via the first access point, from the client. The first frame includes a request for the information, which comprises at least the TBTT of the second access point. The second access point then generates and transmits a second frame, via the first access point, to the client. The second frame includes the information.

In yet another embodiment, the client that collects the information in the wireless network is provided. This information is utilized in the handoff of the client from the first access point to the second access point. The client includes a processing device, transmitter apparatus and receiver apparatus operatively coupled together. The processing device generates a first frame. The first frame includes a request for the information. This information comprises at least the TBTT of the second access point. The transmitter apparatus transmits the first frame to the second access point via the first access point. The receiver apparatus receives a second frame, via the first access point, from the second access point. The second frame includes the information.

FIG. 1 is a block diagram illustrating an environment 100, where various embodiments can be practiced. A plurality of cells, e.g., 102 and 104, of a wireless communication network is illustrated in FIG. 1, through which client devices or clients can wirelessly communicate. The wireless network can be, for example, a wireless metropolitan area network (WMAN), a wireless local area network (WLAN), a wireless personal area network (WPAN), a global system of mobile communications (GSM) network, a personal communication system (PCS) network, a mobitex network, a general packet radio service (GPRS) network, a code division multiple access (CDMA) network, a universal mobile telephone service (UMTS) network, an advanced mobile phone system (AMPS) network, and the like. Each cell of the plurality of cells has at least one access point and zero or more clients. For the purpose of this description, the environment 100 is shown to include a cell 102 and a cell 104. The cell 102 includes an access point 106 and a client 108. Similarly, the cell 104 includes an access point 110 and a client 112. It should be appreciated by those of ordinary skill in the art that environment 100 can include additional cells and that each cell of the plurality of cells can include any number of clients and at least one access point. Examples of clients 108 and 112 include mobile phones, personal digital assistants (PDAs), laptops, and the like. As illustrated, the access point 106 is connected to the access point 110 through a wired and/or wireless backhaul network 114. The wired and/or wireless backhaul network 114 can include one or more access points. The one or more access points in the wired and/or wireless backhaul network 114 can be connected through one or more links. Each of the one or more links can be a wired link or a wireless link.

Environment 100 further includes an authentication server 116 that is used to authenticate a user of a client and/or the client during a handoff from one access point to another access point. Authentication of a user and/or client is the process of verifying the identity of the user/client prior to allowing the user/client to utilize a given network or services, such as for instance, the environment 100. In one embodiment of the present invention, the authentication server 116 supports the RADIUS protocol. However, another AAA protocol can be used such as, for instance, the well known Diameter base protocol as currently defined in RFC 3588.

A method and a system for supporting a more efficient and faster handoff are provided in embodiments of the present invention. A handoff, for instance of the client 108 from the access point 106 to the access point 110, can be made faster if the client 108 is aware of information such as a TBTT, a beacon interval, a scheduling time for coverage, and a scheduling time for the backhaul period of the access point 110, before the handoff. As explained later, in accordance with embodiments described herein, the handoff involves scanning the access point 110 at a TBTT for this access point, which is learned directly from the access point 110. In this manner, the client 108 minimizes its time away from access point 106. In other words, knowing the current TBTT and the beacon interval help to determine the time when the next beacon frame will be broadcasted by the access point 110. Thus, knowledge of the TBTT and the beacon interval help in efficient scheduling of the scanning of each of the access points adjacent to the access point 106, which results in a reduction in the time spent on the scanning. The scheduling time for the coverage indicates when the client 108 can be provided with coverage by the access point 110. The scheduling time for the backhaul period indicates when the access point 110 is transmitting through a backhaul network. The scheduling time for the coverage and the backhaul period of the access point 110 can be used to reduce the time spent on establishing the association between the client 108 and the access point 110.

Consider an embodiment where the client 108 and the access point 110 are configured in accordance with the IEEE standard 802.11i. In this case, using embodiments of the present invention, information (for example the TBTT of the access point 110) can be collected during a pre-authentication process as defined, for instance, in this standard. The information collected during the pre-authentication process can be used during the handoff in the authentication step.

Figure 2:
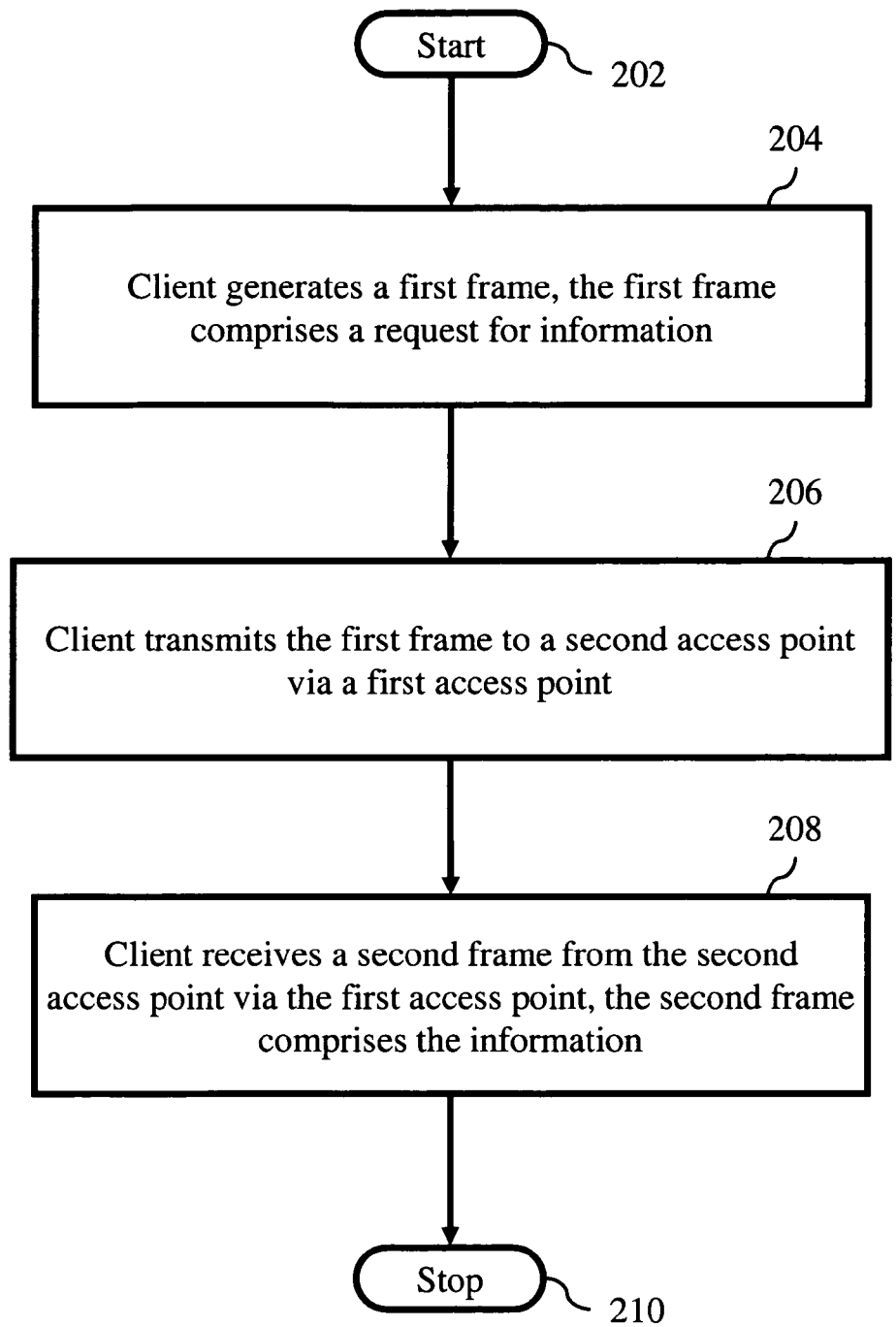
FIG. 2 is a flow diagram illustrating a method for collecting information in a wireless network, in accordance with an embodiment of the present invention.

FIG. 2 is a flow diagram illustrating a method for collecting information in the wireless network, in accordance with an embodiment. The method is initiated at step 202. At step 204, the client 108 generates a first frame. A frame is a unit of information transmitted over a network, which may be used to establish or continue a communications session and may contain data being transmitted between clients during the communications session. This first frame comprises a request for information from an access point for example the access point 110. Examples of the information include a TBTT, a beacon interval, a scheduling time for coverage, a scheduling time for the backhaul period, and the like. At step 206, the client 108 transmits the first frame to the access point 110 via the access point 106. As illustrated in FIG. 1, the first frame has to make one hop. This is however only for exemplary purposes. In accordance with various embodiments, the first frame can make more than one hop. For example, if the wired and/or wireless backhaul network 114 of the environment 100 includes one or more access points, the first frame will go through more than one access point. At step 208, the client 108 receives a second frame from the access point 110 via the access point 106. The second frame includes the information requested. The client 108 can utilize the information to reduce the time spent in the handoff from the access point 106 to the access point 110. Thereafter, the method terminates at step 210.

Figure 3:
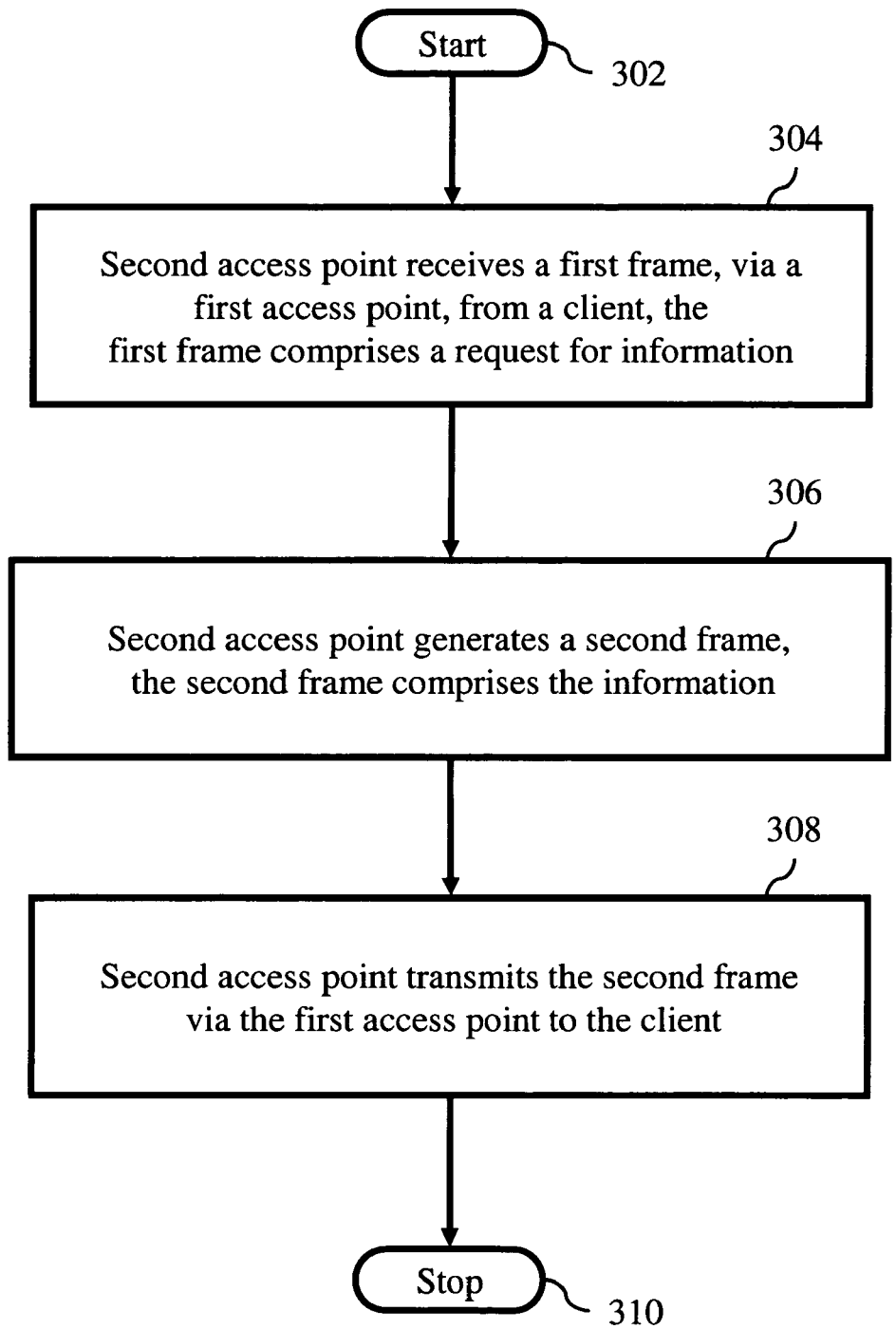
FIG. 3 is a flow diagram illustrating a method for distributing the information in the wireless network, in accordance with an embodiment of the present invention.

FIG. 3 is a flow diagram illustrating a method for distributing the information in the wireless network, in accordance with an embodiment. The method is initiated at step 302. At step 304, the access point 110 receives the first frame, via the access point 106, from the client 108, as a request for the information. At step 306, the access point 110 generates a second frame. This second frame includes the information requested. At step 308, the second access point transmits the second frame, via the access point 106, to the client 108. This information can be utilized to reduce the time spent in the handoff of the client 108 from any access point to the access point 110. Thereafter, the method terminates at step 310.

Figure 4:
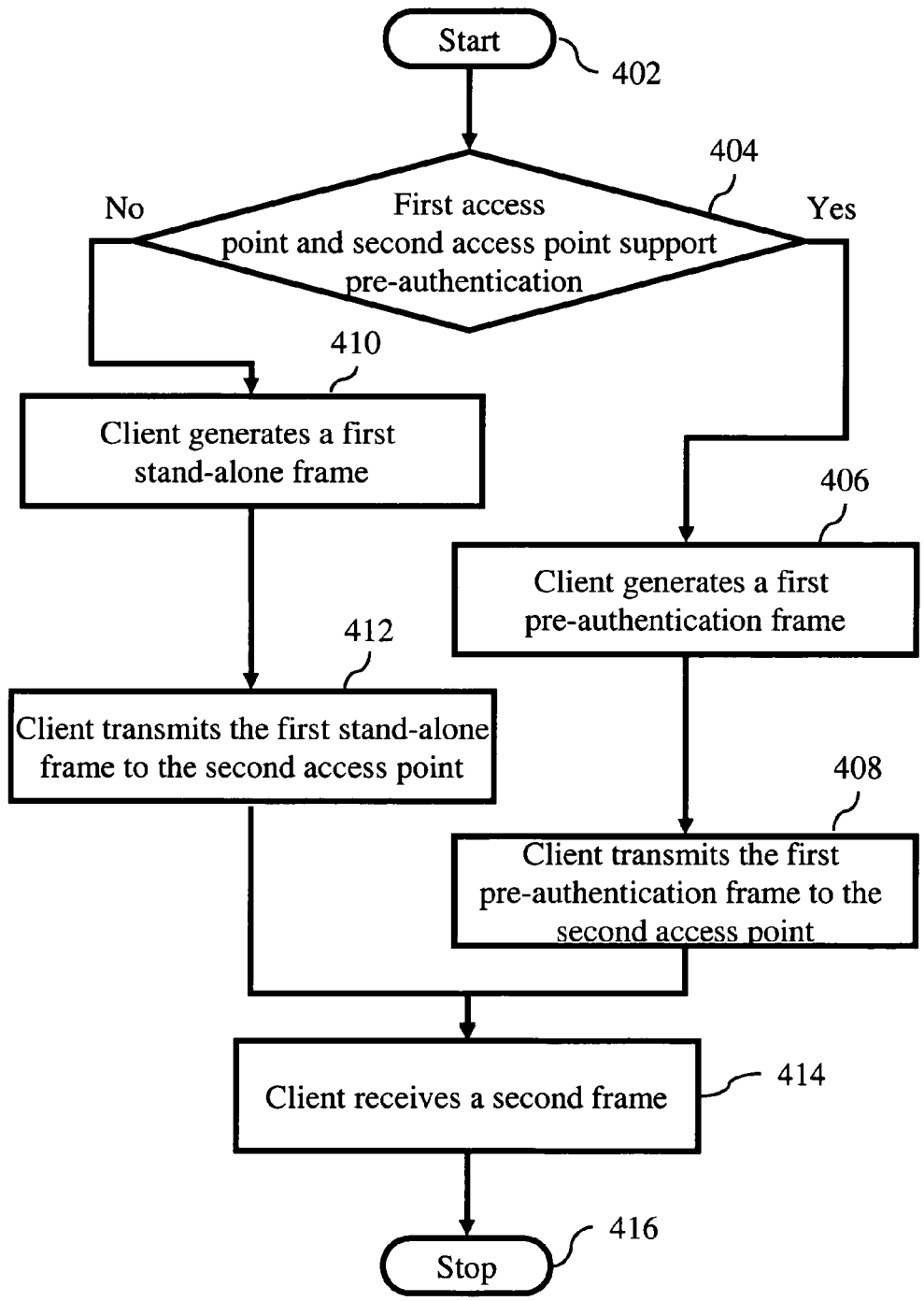
FIG. 4 is a flow diagram illustrating a method for collecting the information in the wireless network, in accordance with another embodiment of the present invention.

FIG. 4 shows a flow diagram illustrating a method for collecting the information in the wireless network, in accordance with another embodiment. The method is initiated at step 402. At step 404, the client 108 determines whether the access point 106 and the access point 110 support a pre-authentication process or feature. For example, a client may learn information to make such a determination from access points broadcasting support of pre-authentication in their Robust Secure Network (RSN) Information Elements included in their beacon frames and/or from neighbor maps. In an embodiment, the pre-authentication feature of the IEEE standard 802.11i is included in the access points. If it is determined at step 404 that the access point 106 and the access point 110 support the pre-authentication feature, then the method continues from step 406. At step 406, the client 108 generates a first pre-authentication frame. The first pre-authentication frame comprises a request for information about an access point for example the access point 110. Here the first pre-authentication frame serves the same purpose as the first frame. In an embodiment, the pre-authentication feature involves a process similar to the IEEE standard 802.1X or Extensible Authentication Protocol Over a Local area network (EAPOL). In accordance with embodiments of the present invention, the first pre-authentication frame can be a modified EAPOL packet or a modified EAPOL start frame. The standard EAPOL packet or the EAPOL start frame can be modified in a manner that conveys to the access point 110 that the client 108 is making a request for the information. The modifications of the standard EAPOL packet or the EAPOL start frame have been further explained in detail in conjunction with FIG. 6. At step 408, the client 108 transmits the first pre-authentication frame to the access point 110 via the access point 106, making a request for the information.

If it is determined at step 404 that the access point 106 and the access point 110 do not support the pre-authentication feature, then the method continues from step 410. At step 410, the client 108 generates a first stand-alone frame. The first stand-alone frame comprises the request for the information about the access point 110. The first stand-alone frame is any frame that is capable of being independently transmitted by the client 108 to the access point 110. In this case, collection of information is performed separately from the pre-authentication process. Here, the first stand-alone frame serves the same purpose as the first frame. At step 412, the client 108 transmits the first stand-alone frame to the access point 110 through the access point 106. At step 414, the client 108 receives the second frame from the access point 110 via the access point 106. This second frame includes the information requested. As explained in detail below, by reference to FIG. 5, if the client generated and transmitted a first stand-alone frame to the access point 110, the second frame will be a second stand-alone frame. Whereas, if the client generated and transmitted a first pre-authentication frame to the access point 110, the second frame will be a second pre-authentication frame.

In another embodiment, the client 108 may receive a neighbor map from the access point 106. This neighbor map comprises a list of access points adjacent to the access point 106. The client 108 selects access points from the neighbor map to formulate a preferred list. The formulation of the preferred list can be based on a parameter. Examples of the parameter include a pre-defined direction, a user's preference, a service being offered by the client 108, the configuration of the client 108, the requirements of the client 108, and the like. The client 108 can also collect the information through pre-authentication with each of the access points listed in the preferred list. Consider a case where the client 108 is located in the eastern part of the cell 102 covered by the access point 106. In this case, the client 108 will typically only be interested in the adjacent access points that lie to the east of the access point 106. Thereafter, the client has to formulate the preferred list containing the access points to the east of the access point 106. The client 108 collects the information from each access point in the preferred list. In another embodiment, the client 108 can update the preferred list by incorporating the information collected by the client 108, to formulate an updated preferred list. The client 108 can utilize the updated preferred list to reduce the time spent during the handoff from the access point 106. Thereafter, the method is terminated at step 416.

Figure 5:
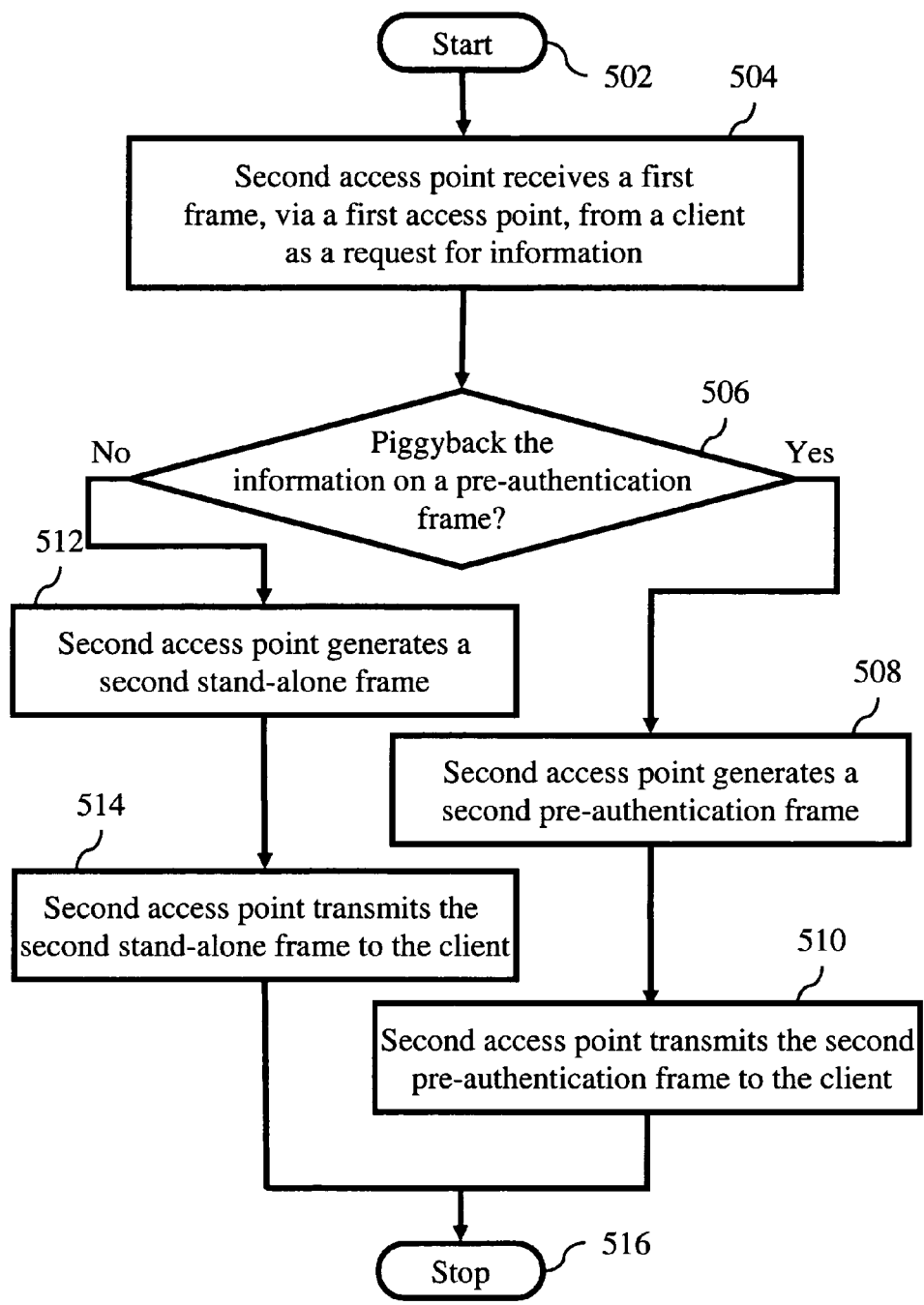
FIG. 5 is a flow diagram illustrating a method for distributing the information in the wireless network, in accordance with another embodiment of the present invention.

FIG. 5 shows a flow diagram illustrating a method for distributing the information in the wireless network, in accordance with another embodiment. The method is initiated at step 502. At step 504, the access point 110 receives the first frame, via the access point 106, from the client 108, as a request for the information. The first frame can be any one of the first stand-alone frame or the first pre-authentication frame (for example the modified EAPOL packet and the EAPOL start frame). At step 506, the access point 110 determines whether to piggyback the information on a pre-authentication frame. If it is determined at step 506 that the access point 110 can utilize piggybacking because the access point 110 supports a pre-authentication feature, the method continues from step 508. At step 508, the access point 110 generates a second pre-authentication frame. This second pre-authentication frame comprises the information requested and serves the same purpose as the second frame. In an embodiment, a process similar to the IEEE 802.1X can support the pre-authentication feature. Here the second pre-authentication frame can be a modified EAPOL packet. The modified EAPOL packet includes the information in the form of a piggyback. In this scenario, the standard EAPOL packet can be modified to provide the information to the client. The modifications made to the standard EAPOL packet have been explained in detail in conjunction with FIG. 7. At step 510, the access point 110 transmits the second pre-authentication frame to the client 108 through the access point 106.

If it is determined at step 506 that the access point 110 is unable to piggyback the information on a pre-authentication frame then the method continues from step 512. At step 512, the access point 110 generates a second stand-alone frame. The second stand-alone frame includes the information, and is any frame that is capable of being independently transmitted to the client 108 by the access point 110. Here, the second stand-alone frame serves the same purpose as the second frame. At the step 514, the access point 110 transmits the second stand-alone frame to the client 108 through the access point 106.

In an embodiment, the access point 106 also transmits the neighbor map to the client 108. The neighbor map comprises a list of access points adjacent to the access point 106. In another embodiment, the neighbor map can contain the Ethernet addresses of the access points adjacent to the access point 106. The neighbor map can include a reference to the access point 110, the access point 110 being adjacent to the access point 106 as illustrated in FIG. 1. The access point 106 can broadcast the neighbor map after an interval of time. Thereafter, the method is terminated at step 516.

Figure 6:
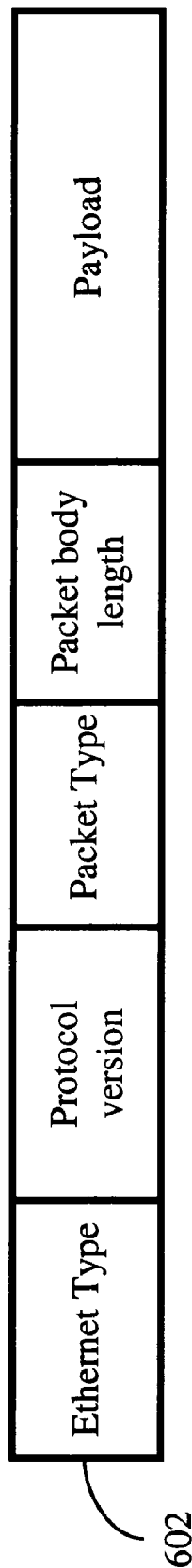
FIG. 6 is block diagram illustrating a first pre-authentication frame, in accordance with an embodiment of the present invention.

FIG. 6 is a block diagram illustrating a first pre-authentication frame 602, in accordance with an embodiment. The first pre-authentication frame 602 can be one of the modified EAPOL packet and the EAPOL start frame. The first pre-authentication frame 602 includes a plurality of fields, including an Ethernet type, a protocol version, a packet type, a packet body length, and a payload.

The Ethernet type includes an Ethernet type value, assigned for use by a port access entity. The port access entity is a logical entity that supports the IEEE standard 802.1X. The port access entity can be configured as the authenticator or a supplicant, in accordance with the IEEE standard 802.11i. In an exemplary embodiment, the value of the Ethernet type can be a two-byte hexadecimal value 88C7. The hexadecimal value 88C7 indicates that the first pre-authentication frame 602 is to be utilized for the purpose of pre-authentication. This helps in differentiating between a frame being used for pre-authentication and one being used for authentication. In another exemplary embodiment, the Ethernet type is a hexadecimal value 888E if the frame is being used for authentication. The protocol version is an unsigned binary number, and includes a value of the version of EAPOL protocol being utilized. The protocol version takes a one-byte hexadecimal value, for example, the one-byte hexadecimal value can be 01. The packet type is an unsigned binary number. The value of the unsigned binary number determines the type of packet. The various types of packets and the corresponding hexadecimal values assigned to the packet type field are as follows:

| | |
|---|---|
| (i) | EAPOL packet - 00 |
| (ii) | EAPOL start - 01 |
| (iii) | EAPOL logoff - 02 |
| (iv) | EAPOL key - 03 |
| (v) | EAPOL alert - 04 |

The hexadecimal values of the packet type field given above are the values used in the IEEE standard 802.1X. The value in the packet type field can be changed to differentiate between the modified EAPOL packet and an EAPOL packet. The modified EAPOL packet can have a new value assigned to the packet type field that is currently not used. An example of the new value is 10. The new value will indicate that the modified EAPOL packet is being used to make a request for information. Similarly, for the modified EAPOL start frame, the value in the packet type field can be changed to differentiate between the modified EAPOL start frame and an EAPOL start frame. The modified EAPOL start frame can have a new value assigned to the packet type field that is currently not used. An example of the new value is 11. This will indicate that the modified EAPOL start frame is being used to make a request for the information. The packet body length is an unsigned binary number, which defines the length in octets of the packet body field. The payload includes data or messages, to be communicated between any client and any access point.

Figure 7:
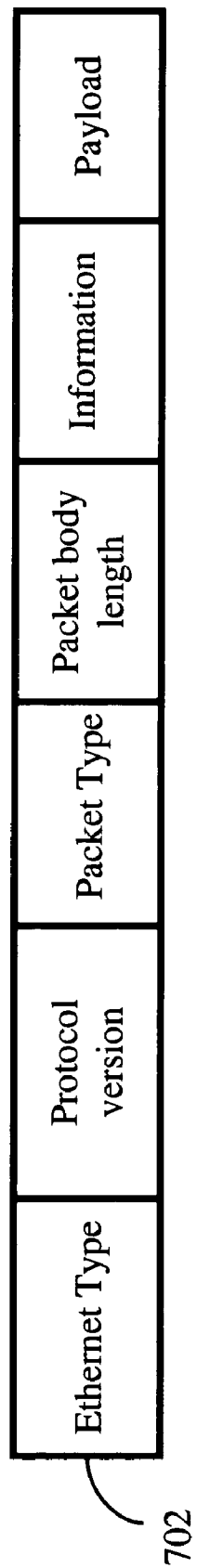
FIG. 7 is block diagram illustrating a second pre-authentication frame, in accordance with an embodiment of the present invention.

FIG. 7 is a block diagram illustrating a second pre-authentication frame 702, in accordance with an embodiment. The second pre-authentication frame 702 can be the modified EAPOL packet. The second pre-authentication frame 702 includes a plurality of fields. The plurality of fields includes the Ethernet type, the protocol version, the packet type, the packet body length, the information, and the payload. As evident, most of the fields of the second pre-authentication frame 702 are similar to those of the first pre-authentication frame 602. The second pre-authentication frame 702 further comprises the information requested by the client. In an embodiment, the information can also be defined by a plurality of fields, which includes a length, content bits, and content. The length field can indicate the length of the content. Alternatively, the length field can indicate the total length of the information. The content bits determine what kind of content is present in the content field. Examples of the kind of content include, but are not limited to, the TBTT, the beacon interval, and the scheduling time for coverage of the access point 110 as well as for the backhaul period of the access point 110. Here, the access point 110 transmits the second pre-authentication frame 702. In another embodiment, more than one kind of content can be present in the second pre-authentication frame 702. In this embodiment, the content bits indicate the presence of each of the more than one kind of content.

Figure 8:
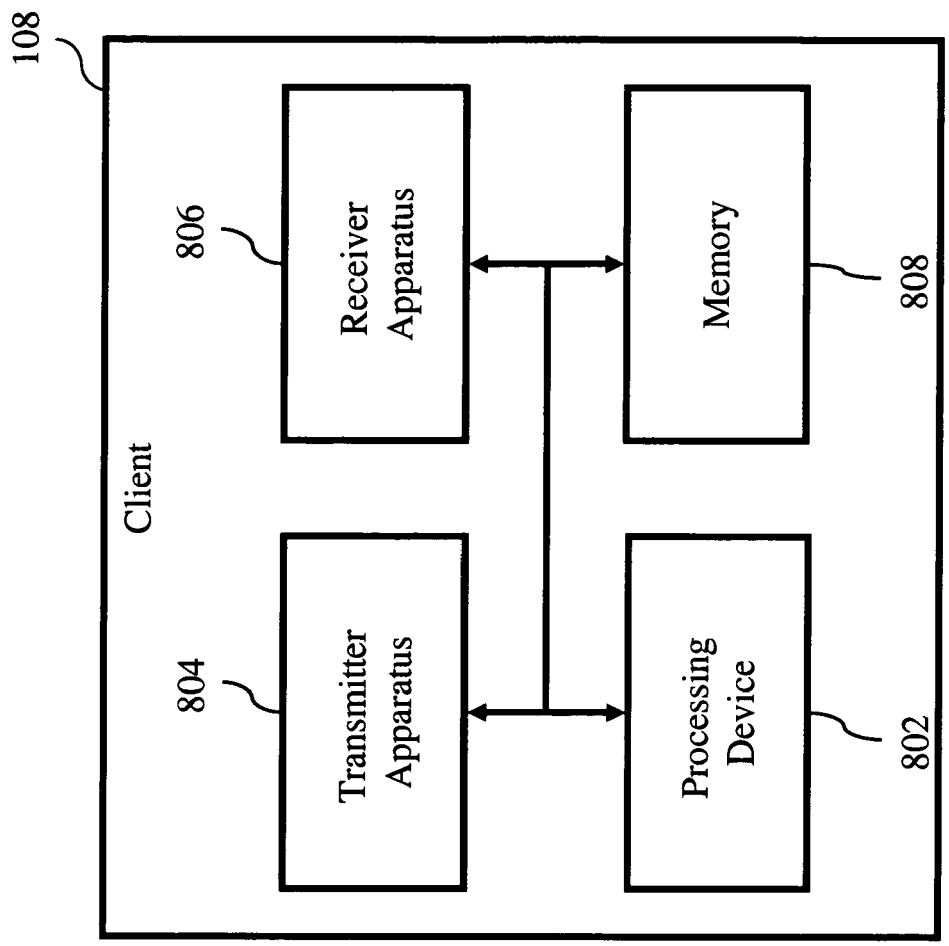
FIG. 8 is block diagram illustrating a client, in accordance with an embodiment of the present invention.

FIG. 8 is a block diagram illustrating the client 108, in accordance with an embodiment. As illustrated, the client 108 includes a processing device 802, a transmitter apparatus 804, a receiver apparatus 806 and a suitable memory 808. The processing device 802 generates the first frame. The transmitter apparatus 804 transmits the first frame to the access point 110, as a request for the information. The access point 110 receives the first frame through the access point 106. The receiver apparatus 806 receives the second frame sent by the access point 110. The second frame is received by the client 108 through the access point 106 and includes the information.

The memory 808 stores the neighbor map, the preferred list, and the updated preferred list as described in conjunction with FIGS. 4 and 5. The formulation of the preferred list can be based on the parameter. Examples of the parameter include a pre-defined direction, a user's preference, a service being offered by the client 108, the configuration of the client 108, the requirements of the client 108, and the like. The processing device 802 revises the preferred list by incorporating the information in it to formulate an updated preferred list. The client 108 scans the access points adjacent to the access point 106 by using TBTTs provided in the updated preferred list.

The client 108 also utilizes the scheduling time for the coverage of the access point 110 and the scheduling time for the backhaul period of the access point 110. Efficient scheduling results in reduction of the time spent in establishing an association with the access point 110. In yet another embodiment, the client 108 can be configured as the supplicant, in accordance with the IEEE 802.11 standard. The access point 110 can then be configured as the authenticator, in accordance with the IEEE 802.11 standard.

The system described above and the method for pre-authentication by collecting the information in the wireless network offers various advantages. Information such as the TBTT, the beacon interval, and the scheduling time for coverage and the backhaul period enable a faster and smoother handoff. This is required especially in the case of services such as the multimedia-based services, Internet telephony, dedicated link emulation, and the like. In an embodiment, the information is collected through pre-authentication, which indicates that the handoff is imminent. Therefore, the information is current and accurate. The system described above is more efficient in terms of the time required for handoff. This is because collection of information and pre-authentication are merged into one process. In an embodiment, the client 108 can select the preferred list of access points, based on the parameter. The client 108 pre-authenticates and collects information from each access point in the preferred list. Therefore, the client 108 does not have to maintain information on all the access points that are adjacent to the access point 106. This results in saving memory and processing time.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. A method performed in a client for collecting information in a wireless network that is utilized in a handoff of the client from a first access point to a second access point, the method comprising the steps of:
   generating a first frame comprising a request for the information, wherein the information comprises at least a target beacon transmission time (TBTT) of the second access point;
   transmitting the first frame to the second access point via the first access point; and
   receiving a second frame comprising the information from the second access point via the first access point.

2. The method as recited in claim 1, wherein the information further comprises at least one of a beacon interval of the second access point, a scheduling time for coverage of the second access point and a scheduling time for backhaul period of the second access point.

3. The method as recited in claim 1, wherein the first frame comprises a first stand-alone frame and the second frame comprises a second stand-alone frame.

4. The method as recited in claim 1, wherein the method is performed during a pre-authentication process and the first frame is a first pre-authentication frame and the second frame is a second pre-authentication frame.

5. The method as recited in claim 4, wherein the first pre-authentication frame comprises one of a modified extensible authentication protocol over local area network (EAPOL) packet and a modified EAPOL start frame, and the second pre- authentication frame comprises a modified EAPOL packet.

6. The method as recited in claim 1 further comprising the steps of:
   receiving a neighbor map comprising a list of access points adjacent to the first access point; and
   determining a preferred list based on the neighbor map, the preferred list comprising a list of access points with which the client collects information comprising at least a corresponding TBTT for each of the access points in the preferred list.

7. The method as recited in claim 6 further comprising the steps of:
   updating the preferred list with the information to create an updated preferred list; and
   scanning the access points in the updated preferred list at the corresponding TBTTs supplied in the information.

8. A method performed in a second access point for distributing information in a wireless network that is utilized in a handoff of a client from a first access point to the second access point, the method comprising the steps of:
   receiving a first frame from the client via the first access point, the first frame comprising a request for the information, wherein the information comprises at least a target beacon transmission time (TBTT) of the second access point;
   generating a second frame comprising the information; and
   transmitting the second frame to the client via the first access point.

9. The method as recited in claim 8, wherein the information further comprises at least one of a beacon interval of the second access point, a scheduling time for coverage of the second access point and a scheduling time for backhaul period of the second access point.

10. The method as recited in claim 8, wherein the first frame comprises a first stand-alone frame and the second frame comprises a second stand-alone frame.

11. The method as recited in claim 8, wherein the method is performed during a pre-authentication process and the first frame is a first pre-authentication frame and the second frame is a second pre-authentication frame.

12. The method as recited in claim 11, wherein the first pre-authentication frame comprises one of a modified extensible authentication protocol over local area network (EAPOL) packet and a modified EAPOL start frame, and the second pre- authentication frame comprises a modified EAPOL packet.

13. An access point operatively configured for performing the method as recited in claim 8, wherein the access point is further configured as an authenticator in accordance with 802.11i standard.

14. A client associated with a first access point comprising:
a processing device generating a first frame comprising a request for information, wherein the information comprises at least a target beacon transmission time (TBTT) of a second access point;
a transmitter apparatus coupled to the processing device and transmitting the first frame to the second access point via the first access point; and
a receiver apparatus coupled to the processing device and receiving, from the second access point via the first access point, a second frame comprising the information.

15. The client as recited in claim 14, the receiver apparatus further receiving a neighbor map comprising a list of access points adjacent to the first access point and their attributes, and the client further comprising a memory storing the neighbor map.

16. The client as recited in claim 15, the processing device further:
determining a preferred list based on the neighbor map, the preferred list comprising a list of access points with which the client collects information comprising at least a corresponding TBTT for each of the access points in the preferred list;
updating the preferred list with the information to create an updated preferred list; and
scanning the access points in the updated preferred list at the corresponding TBTTs supplied in the information.

17. The client as recited in claim 14, wherein the client is further configud as a supplicant in accordance with 802.11i standard.

* * * * *

UNITED STATES PATENT AND TRADEMARK OFFICE
CERTIFICATE OF CORRECTION

| | | |
|---|---|---|
| PATENT NO. | : 7,710,915 B2 | Page 1 of 1 |
| APPLICATION NO. | : 11/413585 | |
| DATED | : May 4, 2010 | |
| INVENTOR(S) | : Korus | |

It is certified that error appears in the above-identified patent and that said Letters Patent is hereby corrected as shown below:

1. In Column 10, Line 39, in Claim 5, delete "pre- authentication" and insert -- pre-authentication --, therefor.

2. In Column 11, Line 17, in Claim 12, delete "pre- authentication" and insert -- pre-authentication --, therefor.

3. In Column 12, Line 25, in Claim 17, delete "configud" and insert -- configured --, therefor.

Signed and Sealed this
Eleventh Day of October, 2011

David J. Kappos
*Director of the United States Patent and Trademark Office*